US012676328B2

(12) United States Patent
Nakamura

(10) Patent No.: US 12,676,328 B2
(45) Date of Patent: Jul. 7, 2026

(54) HYDROGEN STORAGE APPARATUS

(71) Applicant: TOYOTA JIDOSHA KABUSHIKI KAISHA, Toyota (JP)

(72) Inventor: Masashi Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 799 days.

(21) Appl. No.: 17/939,010

(22) Filed: Sep. 7, 2022

(65) Prior Publication Data

US 2023/0110620 A1      Apr. 13, 2023

(30) Foreign Application Priority Data

Oct. 8, 2021      (JP) .................................. 2021-166366

(51) Int. Cl.
*H01M 8/1007*          (2016.01)
*F17C 1/00*            (2006.01)
*H01M 8/04082*         (2016.01)
*H01M 8/04089*         (2016.01)
(Continued)

(52) U.S. Cl.
CPC ........... *H01M 8/04201* (2013.01); *F17C 1/00* (2013.01); *H01M 8/04089* (2013.01); *H01M 8/0444* (2013.01); *H01M 8/04753* (2013.01); *F17C 2201/056* (2013.01); *F17C 2205/0111* (2013.01); *F17C 2205/013* (2013.01); *F17C 2205/0326* (2013.01); *F17C 2221/012* (2013.01); *F17C 2250/0417* (2013.01); *F17C 2250/0694* (2013.01);
(Continued)

(58) Field of Classification Search
CPC ............. H01M 8/04201; H01M 8/1007; F17C 2270/0184; F17C 2221/012
See application file for complete search history.

(56) References Cited

U.S. PATENT DOCUMENTS

2007/0104995 A1      5/2007   Kajitani et al.
2009/0272590 A1     11/2009   Kim et al.
(Continued)

FOREIGN PATENT DOCUMENTS

DE      10 2010 027 881 A1      10/2011
JP            3069156 U          6/2000
JP         2002-343405 A        11/2002
(Continued)

OTHER PUBLICATIONS

Translation of JP 2010108611 A; Kimura Ryuichi, Yamamuro Shigeki; May 13, 2010.*

*Primary Examiner* — Paul J Gray
(74) *Attorney, Agent, or Firm* — Sughrue Mion, PLLC

(57)      ABSTRACT

A hydrogen storage apparatus of a vehicle driven by a fuel cell comprising hydrogen storage tank holding apparatuses 8, 9 having pluralities of hydrogen storage tank insert parts 10. When the replaceable hydrogen storage tank 20 is inserted into the hydrogen storage tank insert part 10, the hydrogen outflow part 28 of the hydrogen storage tank 20 is coupled with the hydrogen inflow part 23 connected to the fuel cell 40. The grippable handle 24 is formed at the end portion of the hydrogen storage tank 20. A work of inserting the hydrogen storage tank 20 into the hydrogen storage tank insert part 10 and a work of coupling the hydrogen inflow part 23 and the hydrogen outflow part 28 is performed by gripping the handle 24.

14 Claims, 4 Drawing Sheets

(51) Int. Cl.
　　　*H01M 8/0444*　　　(2016.01)
　　　*H01M 8/04746*　　　(2016.01)
(52) U.S. Cl.
　　　CPC ................. *F17C 2270/0178* (2013.01); *F17C 2270/0184* (2013.01); *H01M 2250/20* (2013.01)

(56)　　　　　　　References Cited

U.S. PATENT DOCUMENTS

| | | | |
|---|---|---|---|
| 2015/0217869 | A1 | 8/2015 | Brunaux et al. |
| 2017/0263959 | A1* | 9/2017 | Hosoi ............... H01M 8/04664 |

FOREIGN PATENT DOCUMENTS

| | | |
|---|---|---|
| JP | 2006-92845 A | 4/2006 |
| JP | 2009-184589 A | 8/2009 |
| JP | 2009-270707 A | 11/2009 |
| JP | 2010-108611 A | 5/2010 |
| JP | 2011-204411 A | 10/2011 |
| JP | 2015-530528 A | 10/2015 |
| JP | 2016-90184 A | 5/2016 |
| JP | 2021-10646 A | 2/2021 |
| WO | 2005/045975 A1 | 5/2005 |

* cited by examiner

HYDROGEN STORAGE APPARATUS

FIELD

The present invention relates to a hydrogen storage apparatus.

BACKGROUND

In a vehicle driven by a fuel cell, known in the art is a hydrogen storage apparatus where a hydrogen storage tank is held by a hydrogen storage tank case able to be attached and detached inside a trunk at the rear of the vehicle and, when placing the hydrogen storage tank case inside the trunk, the hydrogen storage tank is connected with the fuel cell through a quick connector (for example, see Japanese Unexamined Patent Publication No. 2009-270707).

SUMMARY

However, in this case, the extra part such as the hydrogen storage tank case is necessary, and it can be said to be desirable to enable a hydrogen storage tank to be replaced by a simpler method not requiring such an extra part.

Therefore, according to the present invention, there is provided a hydrogen storage apparatus of a vehicle driven by a fuel cell, comprising:

a hydrogen storage tank holding apparatus supported by the vehicle and having a plurality of hydrogen storage tank insert parts and replaceable hydrogen storage tanks inserted in the hydrogen storage tank insert parts for supplying hydrogen to the fuel cell of the vehicle, wherein a hydrogen inflow part connected to the fuel cell is formed in a deep portion of each hydrogen storage tank insert part, a hydrogen outflow part which is coupled with the hydrogen inflow part when the hydrogen storage tank is inserted into the hydrogen storage tank insert part is formed at one end portion of the hydrogen storage tank, a grippable handle is formed at another end portion of the hydrogen storage tank, and a work of inserting the hydrogen storage tank into the hydrogen storage tank insert part and a work of coupling the hydrogen inflow part and the hydrogen outflow part are performed by gripping the handle.

In the present invention, it becomes possible to replace hydrogen storage tanks by a simple method without requiring extra parts.

DESCRIPTION OF EMBODIMENTS

Figure 1A:
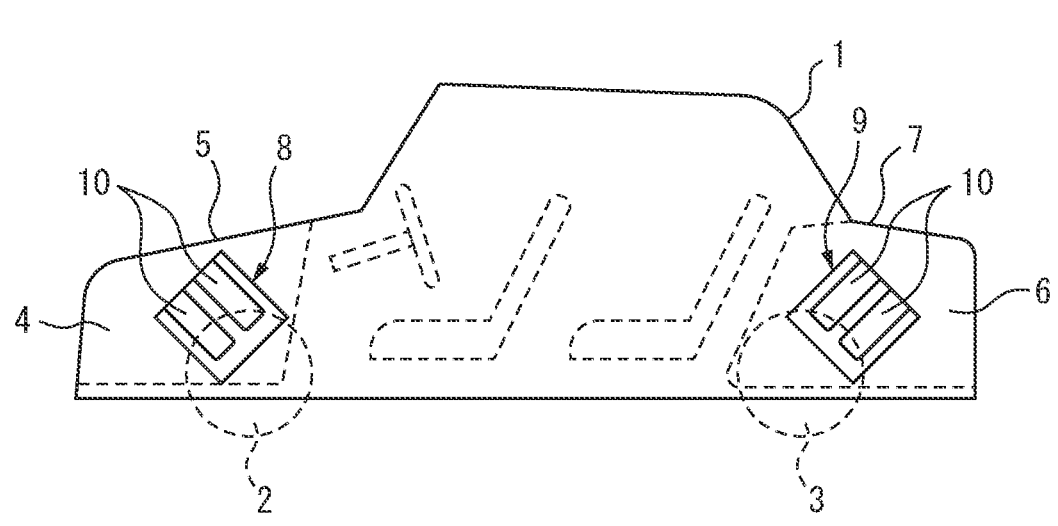
FIG. 1A and FIG. 1B are respectively a side view and plan view of a schematically illustrated vehicle driven by a fuel cell.
Figure 1B:
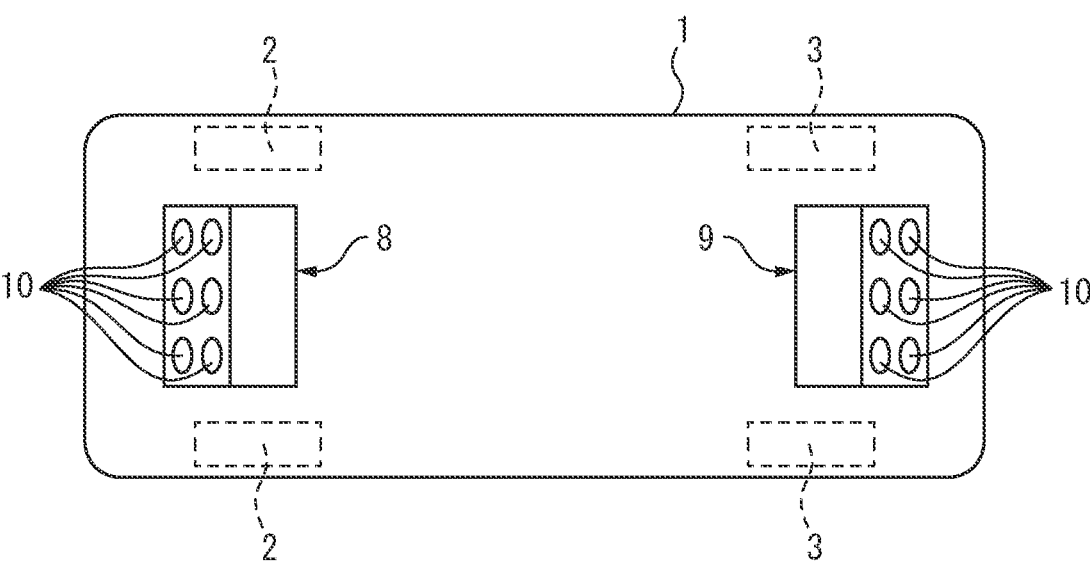

If referring to FIG. 1A and FIG. 1B schematically illustrating a vehicle driven by a fuel cell, 1 indicates a vehicle body, 2 front wheels, 3 rear wheels, 4 a front sub compartment inside the vehicle covered by an openable/closeable front hood 5, 6 a rear sub compartment inside the vehicle covered by an openable/closeable rear hood 7, 8 a hydrogen storage tank holding apparatus having a plurality of hydrogen storage tank insert parts 10, and 9 another hydrogen storage tank holding apparatus having a plurality of hydrogen storage tank insert parts 10.

The hydrogen storage tank holding apparatus 8 is supported inside the front sub compartment 4 by the vehicle body 1, while the hydrogen storage tank holding apparatus 9 is supported inside the rear sub compartment 6 by the vehicle body 1.

In the example shown in FIG. 1A and FIG. 1B, the hydrogen storage tank holding apparatus 8 has six hydrogen storage tank insert parts 10 arranged aligned with each other, while the hydrogen storage tank holding apparatus 9 similarly has six hydrogen storage tank insert parts 10 arranged aligned with each other. Further, in the example shown in FIG. 1A and FIG. 1B, the hydrogen storage tank insert parts 10 of the hydrogen storage tank holding apparatus 8 open facing upward in the front direction of the vehicle 1, while the hydrogen storage tank insert parts 10 of the hydrogen storage tank holding apparatus 9 open facing upward in the rear direction of the vehicle 1. Note that, the number of the hydrogen storage tank insert parts 10 of the hydrogen storage tank holding apparatus 8 can be freely set, and the number of the hydrogen storage tank insert parts 10 of the hydrogen storage tank holding apparatus 9 can also be freely set.

Figures 2A, 2B:
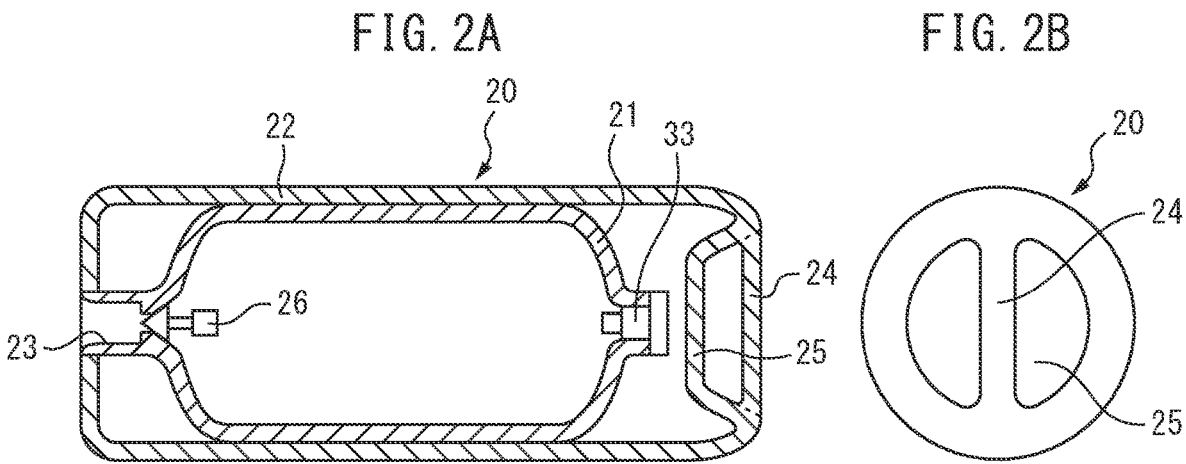
FIG. 2A is a side cross-sectional view of the schematically illustrated hydrogen storage tank.
FIG. 2B is a side view of FIG. 2A.

FIG. 2A shows a side cross-sectional view schematically illustrating a hydrogen storage tank 20 to be inserted into either of the hydrogen storage tank insert part 10 of the hydrogen storage tank holding apparatus 8 or the hydrogen storage tank insert part 10 of the hydrogen storage tank holding apparatus 9 shown in FIG. 1B, while FIG. 2B is a side view of the hydrogen storage tank 20 when viewing the hydrogen storage tank 20 shown in FIG. 2A from the right direction. Referring to FIG. 2A, the hydrogen storage tank 20 is comprised of a tank body 21 and a cylindrical casing 22 surrounding the tank body 21. In the example shown in FIG. 2A, the inside of the tank body 21 is filled with high pressure hydrogen gas. Note that, a hydrogen storing alloy can also be placed inside of the tank body 21.

At one end portion of the tank body 21, that is, one end portion of the hydrogen storage tank 20, a hydrogen outflow part 23 is formed. At the other end portion of the hydrogen storage tank 20, a handle 24 able to be gripped by the hand, that is, a grippable handle 24 is formed. In the example shown in FIG. 2A and FIG. 2B, the two end faces of the cylindrical casing 22, that is, the two end faces of the hydrogen storage tank 20 are formed from flat surfaces. The hydrogen outflow part 23 is formed as a recessed cylindrical groove sunken in from one flat end face of the hydrogen storage tank 20. On the other hand, on the other flat end face of the hydrogen storage tank 20, a recessed groove 25 forming a circular contour shape is formed. Inside this recessed groove 25, a handle 24 is formed extending between facing top edge parts of the recessed groove 25 separated by a distance from the bottom portion of the recessed groove 25 so as to be able to be gripped.

Further, in FIG. 2A, a normally closed type outflow control valve 26 which is placed inside the tank body 21 for controlling the outflow of hydrogen from the hydrogen outflow part 23 is schematically shown. The outflow control valve 26 usually closes the hydrogen outflow part 23 by a pressure of compressed hydrogen inside of the tank body 21.

Figure 2C:
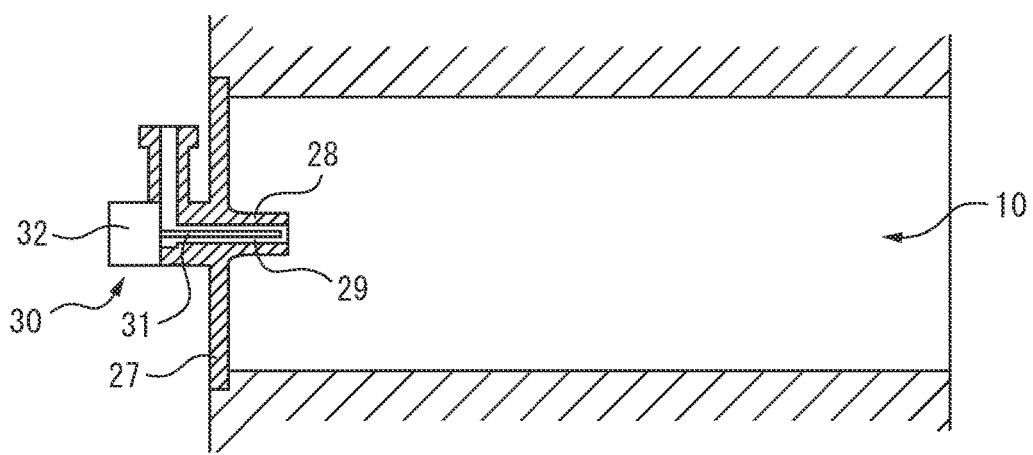
FIG. 2C is a side cross-sectional view of a schematically illustrated hydrogen storage tank insert part.

On the other hand, FIG. 2C shows an enlarged side cross-sectional view of the hydrogen storage tank insert part 10 shown in FIG. 1A and FIG. 1B. Referring to FIG. 2C, the deep portion of the hydrogen storage tank insert part 10 is formed with a projecting hydrogen inflow part 28 sticking out to the inside of the hydrogen storage tank insert part 10 from an end wall 27 covering one end of the hydrogen storage tank insert part 10. Inside of this projecting hydrogen inflow part 28, a hydrogen inflow passage 29 connected to the fuel cell of the vehicle is formed.

Figure 2D:
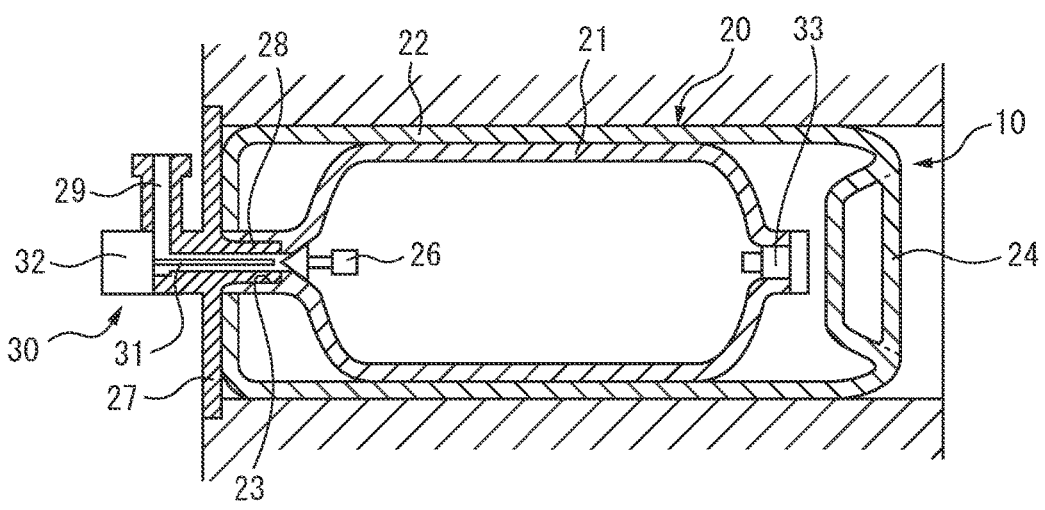
FIG. 2D is a view showing when a hydrogen storage tank is inserted into a hydrogen storage tank insert part.

On the other hand, FIG. 2D shows when the hydrogen storage tank 20 is inserted into the hydrogen storage tank insert part 10. The work of inserting the hydrogen storage tank 20 into the hydrogen storage tank insert part 10 is performed by gripping the handle 24 by the hand, inserting the end portion of the hydrogen storage tank 20 at which the hydrogen outflow part 23 is formed into the hydrogen storage tank insert part 10, and pushing the hydrogen storage tank 20 inside the hydrogen storage tank insert part 10. If the hydrogen storage tank 20 is pushed inside of the hydrogen storage tank insert part 10, the recessed hydrogen outflow part 23 is fitted onto the projecting hydrogen inflow part 28. Explaining this from a structural viewpoint, around the hydrogen storage tank insert part 10, a guide wall is formed for guiding the recessed hydrogen outflow part 23 of the hydrogen storage tank 20 to the projecting hydrogen inflow part 28 when inserting the hydrogen storage tank 20 into the hydrogen storage tank insert part 10. When the hydrogen storage tank 20 is inserted into the hydrogen storage tank insert part 10, the recessed hydrogen outflow part 23 of the hydrogen storage tank 20 is guided by this guide wall to the projecting hydrogen inflow part 28 so as to be fitted onto the projecting hydrogen inflow part 28.

In this case, this guide wall acts to hold the hydrogen storage tank 20 in a state where the recessed hydrogen outflow part 23 is fitted onto the projecting hydrogen inflow part 28. In the example shown in FIG. 2C and FIG. 2D, this guide wall is formed from the cylindrical wall. In this case, this guide wall does not necessarily have to be formed from the cylindrical wall. As this guide wall, for example, in FIG. 2D, a guide rod extending along the circumference of the hydrogen storage tank 20 in the longitudinal direction of the hydrogen storage tank insert part 10 or a guide rod with a guide roller can be used.

On the other hand, the recessed hydrogen outflow part 23 and the projecting hydrogen inflow part 28 have a coupling structure whereby the recessed hydrogen outflow part 23 is coupled with the projecting hydrogen inflow part 28 when the recessed hydrogen outflow part 23 is made to rotate about the long center axis of the hydrogen storage tank 20 after the recessed hydrogen outflow part 23 is fitted onto the projecting hydrogen inflow part 28 as shown in FIG. 2D. As this coupling structure, for example, the inner circumferential surface of the recessed hydrogen outflow part 23 and the outer circumferential surface of the projecting hydrogen inflow part 28 are respectively made screw structures forming screw threads. Therefore, in the example shown in FIG. 2C and FIG. 2D, after the hydrogen storage tank 20 is inserted inside of the hydrogen storage tank insert part 10 and the recessed hydrogen outflow part 23 is fitted onto the projecting hydrogen inflow part 28, by rotating the handle 24 gripped by the hand about the longitudinal center axis of the hydrogen storage tank 20, the recessed hydrogen outflow part 23 is coupled with the projecting hydrogen inflow part 28.

On the other hand, when replacing the hydrogen storage tank 20, the handle 24 is gripped by the hand and the hydrogen storage tank 20 is made to rotate so as to uncouple the recessed hydrogen outflow part 23 and the projecting hydrogen inflow part 28, then the hydrogen storage tank 20 is pulled out from the hydrogen storage tank insert part 10. Then, a new hydrogen storage tank 20 is inserted into the hydrogen storage tank insert part 10. The pulled out hydrogen storage tank 20 is filled by a hydrogen filling apparatus with new hydrogen from the hydrogen outflow part 23.

In this way, the work of inserting the hydrogen storage tank 20 inside of the hydrogen storage tank insert part 10 and the work of coupling the recessed hydrogen outflow part 23 and the projecting hydrogen inflow part 28 can be performed by gripping the handle 24, so the work of setting the hydrogen storage tank 20 at the hydrogen storage tank holding apparatus 8 and the work of detaching it, that is, the work of replacing the hydrogen storage tank 20, can be easily performed. Further, by gripping the handle 24 by the hand, the hydrogen storage tank 20 can be easily transported. Further, since the two end faces of the hydrogen storage tank 20 are formed from flat surfaces, the hydrogen storage tank 20 can be placed standing on the floor and, further, hydrogen storage tanks 20 can be easily stacked in a standing state. Therefore, the hydrogen storage tanks 20 are easily stored.

In this way, in the embodiment of the present invention, the hydrogen storage apparatus is comprised of hydrogen storage tank holding apparatuses 8 and 9 supported by the vehicle and having pluralities of hydrogen storage tank insert parts 10 and of replaceable hydrogen storage tanks 20 inserted in the hydrogen storage tank insert parts 10 for supplying hydrogen to the fuel cell of the vehicle. The hydrogen inflow parts 28 connected to the fuel cell are formed at the deep portions of the hydrogen storage tank insert parts 10. Hydrogen outflow parts 23 which are coupled with the hydrogen inflow parts 28 when the hydrogen storage tanks 20 are inserted into the hydrogen storage tank insert parts 10 are formed at one end portions of the hydrogen storage tanks 20 while the handles 24 able to be gripped are formed at other end portions of the hydrogen storage tanks 20. The work of inserting the hydrogen storage tanks 20 inside of the hydrogen storage tank insert parts 10 and the work of coupling the hydrogen inflow parts 28 and the hydrogen outflow parts 23 are performed by gripping the handles 24. In this case, in the embodiment of the present invention, the work of coupling the hydrogen inflow parts 28 and the hydrogen outflow parts 23 is performed by gripping the handles 24 and rotating the hydrogen storage tanks 20.

On the other hand, valve opening control devices 30 for controlling the opening of the normally closed type outflow control valves 26 are arranged at the projecting hydrogen inflow parts 28. In FIG. 2C and FIG. 2D, this valve opening control device 30 is schematically showed. In the example of FIG. 2C and FIG. 2D, this valve opening control device 30 is comprised of a control rod 31 able to engage with the outflow control valve 26 and an actuator 32 comprised of, for example, a solenoid, for driving the control rod 31. If the solenoid is energized, the control rod 31 abuts against the outflow control valve 26 to push up the outflow control valve 26. As a result, the outflow control valve 26 opens and high pressure stored hydrogen inside the tank body 21 flows to the inside of the hydrogen inflow passage 29 of the hydrogen inflow part 28. If the solenoid is deenergized, the outflow control valve 26 is closed and the outflow of stored hydrogen from the tank body 21 stops.

Further, as shown in FIG. 2A and FIG. 2D, a sensor 33 for detecting the state of stored hydrogen inside the hydrogen storage tank 20 is arranged at the end portion of the tank body 21 at the opposite side to the hydrogen outflow part 23, that is, the end portion side of the hydrogen storage tank 20 at the opposite side from the hydrogen outflow part 23. This sensor 33 is comprised of a sensor for detecting at least one of the pressure and temperature. In the example shown in FIG. 2A and FIG. 2D, the sensor 33 has a built-in transmission device for transmitting the detection signal to the outside. In this case, the detection signal of the sensor 33 can also be transmitted to the outside through a signal wire.

Figure 3:
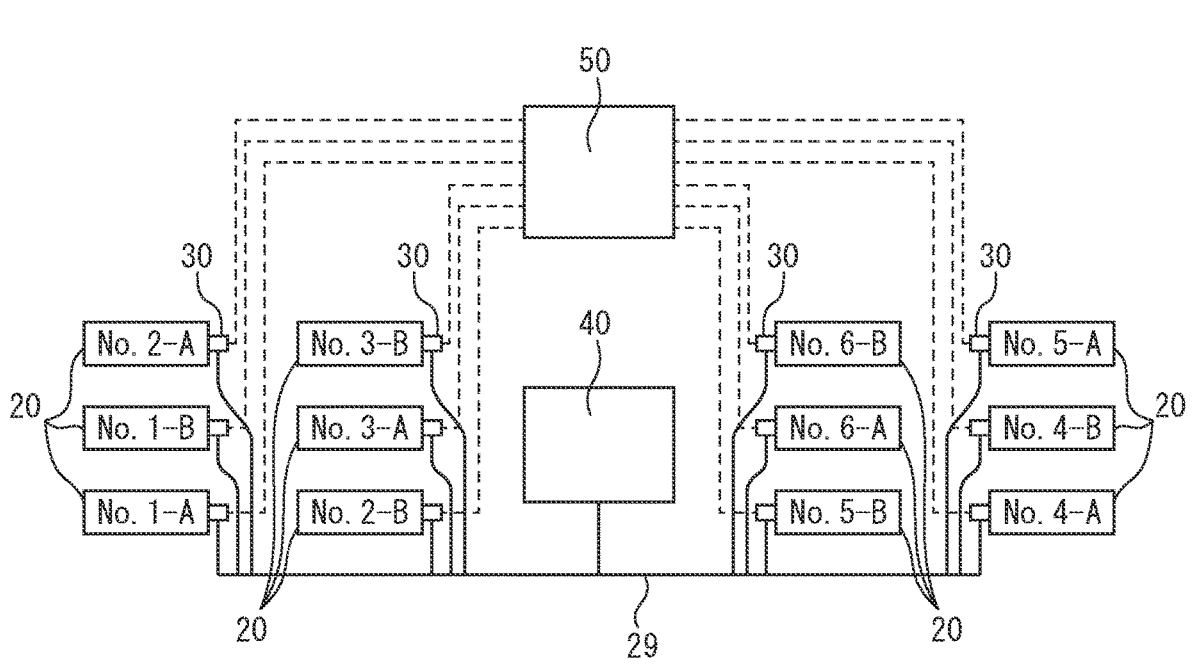
FIG. 3 is a view showing a hydrogen supply control device.

FIG. 3 shows an overall view of a hydrogen supply control device. In FIG. 3, the hydrogen storage tanks 20 inserted into the hydrogen storage tank insert parts 10 of hydrogen storage tank holding apparatuses 8 and 9 are shown. Note that, in the example shown in FIG. 3, for convenience in explanation, the hydrogen storage tanks 20 inserted into the hydrogen storage tank insert parts 10 of the hydrogen storage tank holding apparatus 8 are assigned the references No. 1-A, No. 1-B, No. 2-A, No. 2-B, No. 3-A, and No. 3-B while the hydrogen storage tanks 20 inserted into the hydrogen storage tank insert parts 10 of the hydrogen storage tank holding apparatus 9 are assigned the references No. 4-A, No. 4-B, No. 5-A, No. 5-B, No. 6-A, and No. 6-B.

Figure 4:
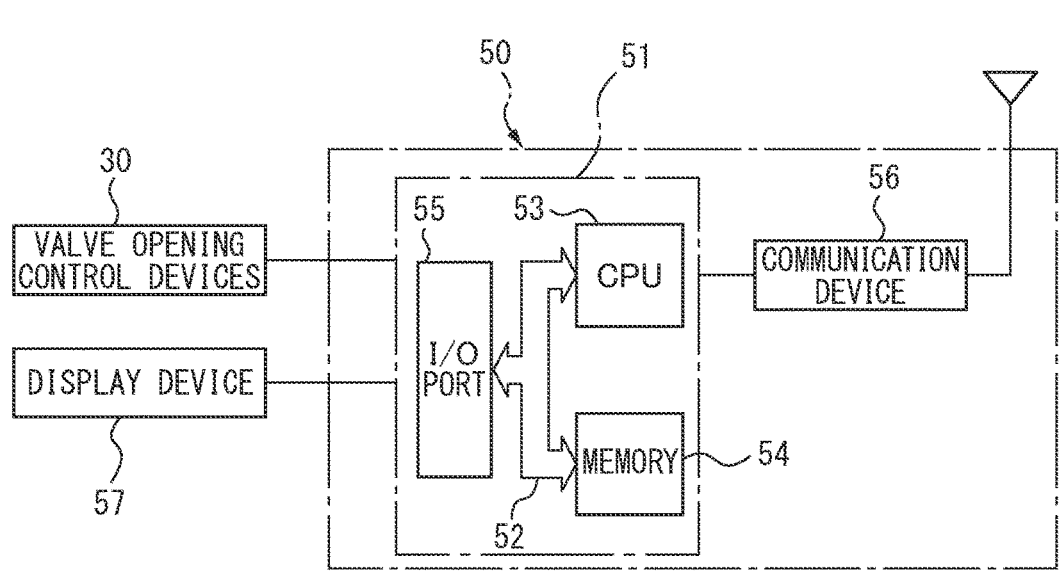
FIG. 4 is a view showing an electronic control device.

As shown in FIG. 3, all of the hydrogen storage tanks 20 are connected to the fuel cell 40 for driving the vehicle through the hydrogen inflow passage 29 shown by the solid line. The valve opening control devices 30 provided at the hydrogen storage tank insert parts 10, as shown by the broken lines, are connected to an electronic control device 50. On the other hand, FIG. 4 shows the electronic control device 50 of FIG. 3. As shown in FIG. 4, this electronic control device 50 is provided with an electronic control unit 51. This electronic control unit 51 is comprised of a digital computer provided with a CPU (microprocessor) 53, a memory 54 comprised of a ROM and RAM, and an input/output port 55, which are connected with each other by a bidirectional bus 52.

Further, the electronic control device 50 is provided with a communication device 56. This communication device 56 is connected to the electronic control unit 51. The detection signals emitted from the sensors 33 of the hydrogen storage tanks 20 are input through the communication device 56 to the electronic control unit 51. Further, as shown in FIG. 4, the valve opening control devices 30 are connected to the electronic control unit 51. Opening of the outflow control valves 26 is controlled by the valve opening control devices 30 based on the output signals of the electronic control unit 51. Further, a display device 57 having a display screen is connected to the electronic control unit 51. The display on the display screen of the display device 57 is controlled based on the output signals of the electronic control unit 51.

In the embodiment of the present invention, hydrogen is supplied to the fuel cell 40 from pairs of hydrogen storage tanks 20. If the remaining amount of hydrogen in a pair of hydrogen storage tanks 20 becomes small, hydrogen starts to be supplied to the fuel cell 40 from a new pair of hydrogen storage tanks 20, and hydrogen stops being supplied to the fuel cell 40 from the pair of hydrogen storage tanks 20 which had been used up to then. Therefore, it becomes possible to continue the supply of hydrogen to the fuel cell 40 without stopping.

Therefore, the fuel cell 40 can continuously produce output.

Figure 5:
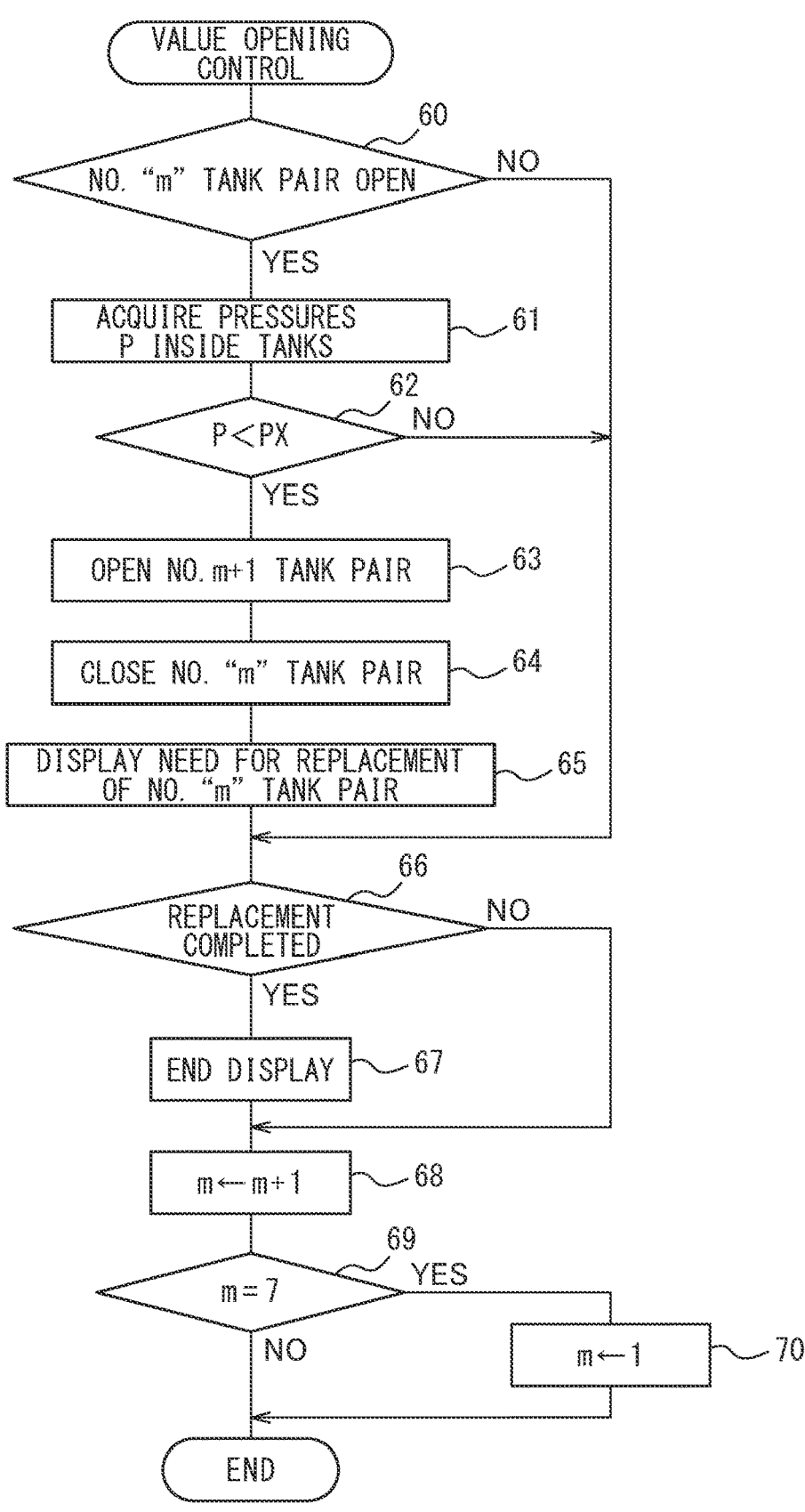
FIG. 5 is a flow chart for valve opening control.

FIG. 5 shows a valve opening control routine for controlling opening of the normally closed type outflow control valve 26. This routine is repeatedly performed in the electronic control unit 51. Referring to FIG. 5, first, at step 60, it is judged if the outflow control valves 26 of the No. "m" pair of hydrogen storage tanks 20 are open. Now, if assuming that m=1, it is judged if the outflow control valve 26 of the No. 1-A hydrogen storage tank 20 and the outflow control valve 26 of the No. 1-B hydrogen storage tank 20 are open. When it is judged that the outflow control valves 26 of the No. "m" pair of hydrogen storage tanks 20 are not open, the routine jumps to step 66. As opposed to this, when at step 60 it is judged that the outflow control valves 26 of the No. "m" pair of hydrogen storage tanks 20 are open, the routine proceeds to step 61.

At step 61, the pressures P of the stored hydrogen in the No. "m" pair of hydrogen storage tanks 20 detected by the sensors 33 of the No. "m" pair of hydrogen storage tanks 20 are acquired. In the example shown in FIG. 5, this pressures P are used as the values for estimating the remaining amounts of hydrogen in the hydrogen storage tanks 20. Next, at step 62, it is judged whether the pressure P of the stored hydrogen inside at least one hydrogen storage tank 20 of the No. "m" pair of hydrogen storage tanks 20 falls below a set pressure PX showing an allowable limit value of the remaining amount of hydrogen, that is, whether the estimated remaining amount of hydrogen of the hydrogen storage tank 20 falls below a set amount of hydrogen. When it is judged that the pressure P of the stored hydrogen inside at least one hydrogen storage tank 20 of the No. "m" pair of hydrogen storage tanks 20 does not fall below the set pressure PX, the routine jumps to step 66. As opposed to this, when at step 62 it is judged that the pressure P of the stored hydrogen inside at least one hydrogen storage tank 20 of the No. "m" pair of hydrogen storage tanks 20 falls below the set pressure PX, the routine proceeds to step 63.

At step 63, the outflow control valves 26 of the No. m+1 pair of hydrogen storage tanks 20 are made to open. Next, at step 64, the outflow control valves 26 of the No. "m" pair of hydrogen storage tanks 20 are made to close. Next, at step 65, a display to the effect that the No. "m" pair of hydrogen storage tanks 20 should be replaced, for example, a display of "Need for replacement of the No. m-A hydrogen storage tank and No. m-B hydrogen storage tank" is shown on the display screen of the display device 57. Next, the routine proceeds to step 66. At step 66, it is judged if the No. "m" pair of hydrogen storage tanks 20 have been replaced. When it is judged that the No. "m" pair of hydrogen storage tanks 20 have not been replaced, the routine jumps to step 68. As opposed to this, when at step 66 it is judged that the No. "m" pair of hydrogen storage tanks 20 have been replaced, the routine proceeds to step 67 where the display to the effect that the No. "m" pair of hydrogen storage tanks 20 should be replaced is ended. Next, the routine proceeds to step 68.

Note that, when each No. "m" pair of hydrogen storage tanks 20 have been replaced, for example, to be able to recognize that the detection signals of the sensors 33 of the new pair of hydrogen storage tanks 20 are the detection signals of the sensors 33 of the No. "m" pair of hydrogen storage tanks 20, for example, information showing the numbers of the hydrogen storage tanks 20, that is, the No. m-A tank and No. m-B tank, is sent from the sensors 33 of the hydrogen storage tanks 20 together with the detection signals. At step 66, it is judged based on this information if the No. "m" pair of hydrogen storage tanks 20 have been replaced.

At step 68, "m" is incremented by exactly 1, then, at step 69, it is judged if "m" becomes 7. When it is judged that "m" is not 7, the processing cycle is ended. As opposed to this, when it is judged that m=7, the routine proceeds to step 70 where "m" is made 1, then the processing cycle is ended. Therefore, control to open the ordinarily closed type outflow control valves 26 of the No. 1 pair of hydrogen storage tanks No. 1-A and No. 1-B to the No. 6 pair of hydrogen storage tanks No. 6-A and No. 6-B is repeatedly performed.

Note that, in this way, if performing control so as to make stored hydrogen be supplied from a pair of hydrogen storage tanks 20 at all times, even if for some reason or another, stored hydrogen is not supplied from one hydrogen storage tank 20, stored hydrogen is supplied from the other hydrogen storage tank 20. Therefore, there is the advantage that the possibility of being able to stop the supply of stored hydrogen from the hydrogen storage tanks 20 from being interrupted.

In this way, in the embodiment of the present invention, a hydrogen supply control device for controlling the supply of hydrogen from the hydrogen storage tanks 20 to the fuel cell 40 is provided. This hydrogen supply control device has a remaining hydrogen amount estimating unit for estimating the remaining amount of hydrogen in the hydrogen storage tanks 20. A hydrogen storage tank 20 for supplying hydrogen to the fuel cell 40 is selected based on the estimated remaining amount of hydrogen inside the hydrogen storage tanks 20. In this case, the electronic control unit 51 forms this remaining hydrogen amount estimating unit.

Further, in this case, in the embodiment of the present invention, a pair of hydrogen storage tanks 20 are selected from among the hydrogen storage tanks 20 held by the hydrogen storage tank holding apparatuses 8 and 9, hydrogen is supplied from the selected pair of hydrogen storage tanks 20 to the fuel cell 40, and, when the estimated remaining amount of hydrogen of at least one hydrogen storage tank 20 among the selected pair of hydrogen storage tanks 20 falls below a set amount of hydrogen, a next pair of hydrogen storage tanks 20 are selected from among the hydrogen storage tanks 20 held by the hydrogen storage tank holding apparatuses 8 and 9, and hydrogen is supplied from the selected next pair of hydrogen storage tanks 20 to the fuel cell 40.

Further, in the embodiment of the present invention, the hydrogen supply control device has the display device 57 for displaying the fact that the hydrogen storage tank 20 should be replaced when an estimated remaining amount of hydrogen of the hydrogen storage tank 20 falls below the set amount of hydrogen. Further, in the embodiment of the present invention, the sensor 33 is placed for detecting the state of stored hydrogen in the hydrogen storage tank 20 at the end portion of the hydrogen storage tank 20 at the opposite side to the hydrogen outflow part 23, and the above-mentioned remaining hydrogen amount estimating unit estimates the remaining amount of hydrogen in the hydrogen storage tank 20 based on the detection signal of the sensor 33.

What is claimed is:

1. A hydrogen storage apparatus of a vehicle driven by a fuel cell, comprising:
a hydrogen storage tank holding apparatus supported by the vehicle and having a plurality of hydrogen storage tank insert parts;
replaceable hydrogen storage tanks inserted in the hydrogen storage tank insert parts for supplying hydrogen to the fuel cell of the vehicle;
a hydrogen inflow part, connected to the fuel cell, protruding from an end wall of each hydrogen storage tank insert part toward an inside of the hydrogen storage tank insert part;
a hydrogen outflow part, which is coupled with the hydrogen inflow part when a replaceable hydrogen storage tank among the replaceable hydrogen storage tanks is inserted into the hydrogen storage tank insert part, that is a recess formed at one end portion of a casing of the replaceable hydrogen storage tank; and
a grippable handle formed at another end portion of the replaceable hydrogen storage tank, the grippable handle being configured to couple the hydrogen inflow part and the hydrogen outflow part.

2. The hydrogen storage apparatus according to claim 1, wherein the grippable handle is configured to couple the hydrogen inflow part and the hydrogen outflow part by gripping the handle and rotating the replaceable hydrogen storage tank.

3. The hydrogen storage apparatus according to claim 1, wherein the hydrogen inflow part and the hydrogen outflow part are coupled by fitting the recessed hydrogen outflow part of the replaceable hydrogen storage tank onto the projecting hydrogen inflow part.

4. The hydrogen storage apparatus according to claim 3, wherein the recessed hydrogen outflow part and the projecting hydrogen inflow part have a coupling structure where the recessed hydrogen outflow part is coupled with the projecting hydrogen inflow part based on the recessed hydrogen outflow part being made to rotate after fitting the recessed hydrogen outflow part into the projecting hydrogen inflow part.

5. The hydrogen storage apparatus according to claim 4, wherein the coupling structure is comprised of a screw structure.

6. The hydrogen storage apparatus according to claim 1, wherein a guide wall for guiding the hydrogen outflow part of the replaceable hydrogen storage tank to the hydrogen inflow part when inserting the replaceable hydrogen storage tank into the hydrogen storage tank insert part is formed at the hydrogen storage tank insert part.

7. The hydrogen storage apparatus according to claim 6, wherein the guide wall has a cylindrical shape.

8. The hydrogen storage apparatus according to claim 1, wherein a sensor for detecting a state of stored hydrogen inside the replaceable hydrogen storage tank is arranged at the other end part side of the hydrogen storage tank.

9. The hydrogen storage apparatus according to claim 1, wherein two end faces of the replaceable hydrogen storage tank are formed from flat surfaces.

10. The hydrogen storage apparatus according to claim 1, wherein a normally closed type outflow control valve for controlling an outflow of hydrogen from the replaceable hydrogen storage tank is arranged at the hydrogen outflow part, and a valve opening control device for controlling opening of the outflow control valve is arranged at the hydrogen inflow part.

11. The hydrogen storage apparatus according to claim 1, further comprising a hydrogen supply control device for controlling a supply of hydrogen from the replaceable hydrogen storage tank to the fuel cell, the hydrogen supply control device has a remaining hydrogen amount estimating unit for estimating a remaining amount of hydrogen inside the replaceable hydrogen storage tank, and a replaceable hydrogen storage tank for supplying hydrogen to the fuel cell is selected based on the estimated remaining amount of hydrogen inside the replaceable hydrogen storage tank.

12. The hydrogen storage apparatus according to claim 11, wherein a pair of replaceable hydrogen storage tanks from among the replaceable hydrogen storage tanks held by the hydrogen storage tank holding apparatus are configured to supply hydrogen to the fuel cell, when the estimated remaining amount of hydrogen of at least one hydrogen storage tank among the selected pair of replaceable hydrogen storage tanks falls below a set amount of hydrogen, a next pair of replaceable hydrogen storage tanks from the replaceable hydrogen storage tanks held by the hydrogen storage tank holding apparatus is configured to supply hydrogen to the fuel cell.

13. The hydrogen storage apparatus according to claim 11, wherein the hydrogen supply control device has a display device for displaying the fact that the replaceable hydrogen storage tank should be replaced when the estimated remaining amount of hydrogen of the replaceable hydrogen storage tank falls below the set amount of hydrogen.

14. The hydrogen storage apparatus according to claim 11, wherein a sensor for detecting a state of stored hydrogen inside the replaceable hydrogen storage tank is arranged at the other end portion side of the replaceable hydrogen storage tank, and the remaining hydrogen amount estimating unit estimates a remaining amount of hydrogen inside the replaceable hydrogen storage tank based on a detection signal of the sensor.

\* \* \* \* \*